US011518256B2

(12) United States Patent
Schreurs (10) Patent No.: US 11,518,256 B2
(45) Date of Patent: Dec. 6, 2022

(54) SYSTEM AND METHOD FOR WIRELESSLY CHARGING A MOBILE INSPECTION ROBOT IN A POTENTIALLY EXPLOSIVE ATMOSPHERE

(71) Applicant: ExRobotics B.V., Breda (NL)

(72) Inventor: Roelof Schreurs, Zevenbergen (NL)

(73) Assignee: ExRobotics B.V., Breda (NL)

(*) Notice: Subject to any disclaimer, the term of this patent is extended or adjusted under 35 U.S.C. 154(b) by 0 days.

(21) Appl. No.: 16/651,866

(22) PCT Filed: Sep. 28, 2018

(86) PCT No.: PCT/NL2018/050644
§ 371 (c)(1),
(2) Date: Mar. 27, 2020

(87) PCT Pub. No.: WO2019/066656
PCT Pub. Date: Apr. 4, 2019

(65) Prior Publication Data
US 2020/0254890 A1 Aug. 13, 2020

(30) Foreign Application Priority Data
Sep. 28, 2017 (NL) ...................................... 2019636

(51) Int. Cl.
*H01F 27/42* (2006.01)
*H01F 37/00* (2006.01)
(Continued)

(52) U.S. Cl.
CPC ........... *B60L 53/122* (2019.02); *B60L 53/302* (2019.02); *H02J 50/005* (2020.01); *H02J 50/10* (2016.02)

(58) Field of Classification Search
CPC .... B60L 53/122; B60L 53/126; B60L 53/302; B60L 53/39; H02J 50/10; H02J 50/005; G05D 1/0225; G05D 2201/0207
See application file for complete search history.

(56) References Cited

U.S. PATENT DOCUMENTS

2015/0222148 A1* 8/2015 Sampei ................. H01F 27/366
307/104
2016/0327416 A1* 11/2016 Gagne ................... G01L 19/144
(Continued)

FOREIGN PATENT DOCUMENTS

WO 2016153589 A2 9/2016

OTHER PUBLICATIONS

Gießharz, Wikipedia, https://de.wikipedia.org/wiki/Gießharz (downloaded from the internet Mar. 24, 2021, Updated Nov. 3, 2020).
(Continued)

*Primary Examiner* — Rexford N Barnie
*Assistant Examiner* — Rasem Mourad
(74) *Attorney, Agent, or Firm* — The Webb Law Firm (57) ABSTRACT

The invention relates to a system for wirelessly charging an electrically chargeable device, in particular a mobile inspection robot, in a potentially explosive environment. The invention also relates to a charging station for use in such a system according to the invention. The invention further relates to an electrically chargeable device, in particular an inspection robot, for use in such a system according to the invention. In addition, the invention relates to a method for wirelessly charging an electrically chargeable device, in particular a mobile inspection robot, by using such a system according to the invention.

20 Claims, 5 Drawing Sheets

(51) Int. Cl.
*H01F 38/00* (2006.01)
*B60L 53/122* (2019.01)
*H02J 50/10* (2016.01)
*B60L 53/302* (2019.01)
*H02J 50/00* (2016.01)

(56) References Cited

U.S. PATENT DOCUMENTS

2017/0043966 A1* 2/2017 Witelson ................ B01D 33/06
2018/0006506 A1* 1/2018 Baer ....................... H02J 50/12
2019/0113931 A1* 4/2019 Zha ....................... G05D 1/0265
2020/0021125 A1* 1/2020 Thiel ....................... B60R 11/02

OTHER PUBLICATIONS

Potting (electronics), Wikipedia, https://en.wikipedia.org/wiki/Potting_(electronics) (downloaded from the internet Mar. 24, 2021, Updated Nov. 15, 2020).

* cited by examiner

Detail B

SYSTEM AND METHOD FOR WIRELESSLY CHARGING A MOBILE INSPECTION ROBOT IN A POTENTIALLY EXPLOSIVE ATMOSPHERE

CROSS-REFERENCE TO RELATED APPLICATIONS

This application is the United States national phase of International Application No. PCT/NL2018/050644 filed Sep. 28, 2018, and claims priority to The Netherlands Patent Application No. 2019636 filed Sep. 28, 2017, the disclosures of which are hereby incorporated by reference in their entirety.

BACKGROUND OF THE INVENTION

Field of the Invention

The invention relates to a system for wirelessly charging an electrically chargeable device, in particular a mobile inspection robot, in a potentially explosive atmosphere. The invention also relates to a charging station for use in such a system according to the invention. The invention further relates to an electrically chargeable device, in particular an inspection robot, for use in such a system according to the invention. In addition, the invention relates to a method for wirelessly charging an electrically chargeable device, in particular a mobile inspection robot, by using such a system according to the invention.

Description of Related Art

The search for, production of and examination of minerals, in particular oil and gas, is associated with significant safety risks, both onshore and offshore. If these risks are not managed adequately, they may develop into considerable disasters with detrimental effects for people and the environment. A significant risk which plays a part in these cases is usually a permanent risk of explosion. An additional problem is the fact that oil reserves and gas reserves may be provided with significant amounts of hydrogen sulphide—thus, the well-known Kashagan oil field in the Caspian Sea contains approximately 15-20% hydrogen sulphide—which may pose a serious risk to the employees involved and for public health as such. In such potentially explosive, toxic areas, it is actually only possible to work using driverless, remotely controlled inspection robots which are temporarily present in the explosion-proof atmosphere. After they have performed their tasks, the inspection robots are removed from the risky environment, so that the inspection robots can be charged and maintained. However, in many countries and regions, working with equipment in such a potentially explosive atmosphere is subject to strict laws and regulations, including—in Europe—the ATEX 114 Directive 2014/34/EU relating to specific certified equipment for use in potentially explosive areas. This means that only equipment, including inspection robots, may be used which do not use any local sources of ignition, such as hot surfaces, sparks, arc discharges and static electricity, in order to be able to prevent starting an explosion. This makes it very difficult, for example, to provide the inspection robots with a combustion engine and also, up to now, makes it risky and often prohibited to be able to charge electrically powered inspection robots in a potentially explosive atmosphere, which greatly reduces the usability and efficiency of the inspection robots.

It is a first object of the invention to provide a relatively safe system for charging an electrically chargeable device, in particular an inspection robot, which may be used in a potentially explosive atmosphere.

It is a second object of the invention to provide a relatively user-friendly system for charging an electrically chargeable device, in particular an inspection robot, which may be used in a potentially explosive atmosphere.

SUMMARY OF THE INVENTION

At least one of the aforementioned objects can be achieved by providing a system, comprising: at least one substantially electrically insulating first housing, at least one activatable primary coil which is accommodated in the first housing, and at least one thermally conductive and substantially electrically insulating first moulding material which is provided in the first housing and on the primary coil, in particular a synthetic resin and/or a pouring rubber, in such a way that the primary coil is surrounded by the first moulding material and/or by the combination of the first housing and the first moulding material in a substantially air-free manner; and at least one electrically chargeable device, in particular one mobile inspection robot, comprising: at least substantially electrically insulating second housing, at least one secondary coil accommodated in the second housing, at least one thermally conductive and substantially electrically insulating second moulding material which is provided in the second housing and on the secondary coil, in particular a synthetic resin and/or a pouring rubber, in such a way that the secondary coil is surrounded by the second moulding material and/or by the combination of the second housing and the second moulding material in a substantially air-free manner; at least one chargeable power source which is electrically connected to the at least one secondary coil for driving the electrically chargeable device, in particular the mobile inspection robot, wherein, by activating at least one primary coil of at least one inductive charging station, electrical energy can be transmitted wirelessly to at least one secondary coil of at least one electrically chargeable device, in particular one mobile inspection robot, for charging the power source of the aforementioned electrically chargeable device, in particular the aforementioned mobile inspection robot. The advantage of the system according to the invention is that the inspection robot which may be used, for example, for inspecting (searching, producing and examining) minerals, in particular oil and gas, but also other types of electrically chargeable devices which are configured to perform examinations and/or operations, may be charged in a relatively safe manner on site, even in a potentially explosive atmosphere, and thus, for the present, no longer has to be removed from the potentially explosive atmosphere, as a result of which the efficiency of the inspection robot and of other types of electrically chargeable devices is increased significantly, which offers substantial advantages from a commercial and practical point of view. The relatively safe charging process of the electrically chargeable device, in particular the inspection robot, is based on induction charging, in which electrical energy is passed from of the primary coil (transmitting coil) of the inductive charging station to the secondary coil (receiving coil) of the inspection robot via a magnetic field (wirelessly), between two objects. Bringing about this transfer of electrical energy requires no cables and no (risky) electrical plug connection. In addition, induction charging takes place in a special way due to the fact that the primary coil and the secondary coil are each completely surrounded by at least one electrically insulating material, as a result of which the creation of sparks during induction charging can be prevented. In addition, significant local heat production directly around the coils can be prevented because both coils are surrounded in an air-free (gas-free/cavity-free/free from air bubbles) manner and because the heat generated can be dissipated relatively quickly and efficiently via the moulding material which has (relatively good) thermal conductivity. In this case, the moulding material is arranged around a coil and, optionally, around at least some of the number of electrical/electronic components which are connected to the coil, in a liquid state, as a result of which the respective coil may and will be surrounded by the moulding material in an air-free manner, after which the moulding material will at least partly cure, in order to contain the coil in a durable and electrically insulating manner, in which case generation of heat from the coil can be dissipated and/or distributed relatively easily in order to keep the local generation of heat, and thus the risk of explosion, negligibly small. The system according to the invention may comprise several inductive charging stations and/or electrically chargeable devices, in particular several inspection robots. It is conceivable for at least one inductive charging station to be configured to simultaneously charge several electrically chargeable devices, in particular several inspection robots. As the mobile inspection robot is configured to move across a terrain, the inspection robot may also be considered as a (driverless) inspection vehicle or as a robotized inspection vehicle. The system according to the invention may also comprise one or several other types of electrically chargeable devices, such as for example one or several (similar or different) tools, in particular portable tools. Non-limiting examples of an electrically chargeable device, other than an inspection robot, are: a switch, control unit, a sensor, converter, a motor, a machine, a lamp, instrumentation, a robot, a (different type of) electronic component, electrically rechargeable tool and/or a combination of several of the aforementioned examples. In order to improve the readability of this patent, reference will be made below in particular to a mobile inspection robot, but it should be emphasized that in said variant embodiments, another type of electrically chargeable device may also be used. The system according to the invention was primarily developed to be applied in a potentially explosive atmosphere, but this does not exclude the use of the system according to the invention in other, less dangerous environments. With a view to safety, the electrical energy which is to be transmitted by the system per unit time will usually be limited to a maximum of 15 watt (or less).

The primary coil of the inductive charging station (docking station) is usually coupled with at least one electrical power source which also forms part of the inductive charging station. The electrical power source may be rechargeable and may be formed, for example, by a battery, a storage battery or a capacitor. The primary coil may be activated by passing (from the electrical power source) an electric current through the coil, resulting in a magnetic field being generated, which can be used effectively by the secondary coil. It is conceivable for the inductive charging station to comprise at least one solar panel which is connected to the power source of the inductive charging station for charging the power source. This makes it possible to make the inductive charging station function completely autonomously, for a prolonged period of time, without requiring human intervention and a dedicated infrastructure.

Usually, the inductive charging station will comprise at least one first control unit. It may be advantageous if the first control unit is at least partly surrounded by the first moulding material and/or by the combination of the first housing and the first moulding material in a substantially air-free manner. This ensures that the first control unit is also electrically insulated substantially completely and that the heat which develops can be dissipated relatively efficiently via the first moulding material.

The at least one mobile inspection robot preferably comprises at least one second electronic control unit. The second electronic control unit is preferably (also) at least partly surrounded by the second moulding material and/or by the combination of the second moulding material and the second housing in a substantially air-free manner. This ensures that the second control unit is also electrically insulated substantially completely and that the heat which develops can be dissipated relatively efficiently via the second moulding material.

More preferably, the first control unit of the inductive charging station is coupled to an identity sensor for detecting the identity, optionally by means of an identifier (identification element), of a mobile inspection robot and/or wherein the second control unit of the mobile inspection robot is coupled to a second identity sensor for detecting the identity, optionally by means of an identifier, of an inductive charging station, wherein the first control unit and/or the second control unit is/are programmed in such a manner that transfer of electrical energy from the primary coil to the secondary coil and/or charging the power source of the inspection robot only takes place if a detected identity of an inductive charging station and/or a mobile inspection robot corresponds to a predefined identity. This makes it possible to charge an inspection robot, or at least the power source forming thereof, only if the inspection robot is recognised by the inductive charging station. This prevents an inductive charging station from trying to charge any arbitrary inspection robot and/or a foreign object (article), which could possibly result in unsafe situations. An inspection robot and/or an inductive charging station may for example be identified by means of visual inspection (visual recognition), wherein the identity sensor used may, for example, be formed by a camera. It is also conceivable for the identification to be performed in an electronic manner, in which case use is made, for example, of an identifier, for example an RFID tag, which is provided on the inspection robot and/or the inductive charging station and may be read by means of an identity sensor. The predefined identity of an inductive charging station and/or an inspection robot may be stored in a memory which may form part of a first control unit and/or the second control unit.

It is usually advantageous, in particular if the system according to the invention is used in a potentially explosive atmosphere, if the first control unit and/or the second control unit is/are programmed to compare, preferably in a continuous manner, the amount of energy produced by the primary coil and the energy received by the secondary coil and, depending on the result of this comparison, continue or interrupt the transmission of electrical energy from the primary coil to the secondary coil and/or the charging of the power source of the inspection robot. If it is found that too little—less than predefined—energy is received by the secondary coil, this may possibly indicate a safety risk, as a result of which the induction charging process may and usually will be interrupted.

It is preferable if the primary coil engages with the first housing and/or the secondary coil engages with the second housing. Such a direct engagement benefits the transmission efficiency of the electrical energy since it makes it possible to limit the energy transfer barrier as much as possible. It is also preferable if the primary coil and the secondary coil are aligned with respect to each other during the charging process, which also benefits the efficiency of the energy transfer.

In a preferred embodiment, at least one second housing comprises at least one peripheral wall and a bottom wall which is integrally connected to the at least one peripheral wall, wherein the bottom wall of the at least one integrally formed second housing forms a, preferably angled and/or curved, second partition wall to separate the secondary coil from the environment surrounding the electrically chargeable device, in particular the inspection robot. The second housing as such is preferably configured to separate the secondary coil and the second moulding material from the environment surrounding the electrically chargeable device, in particular the inspection robot. By means of this variant embodiment, it is for example possible to prevent the usually relatively reactive and/or flammable and/or fragile moulding material from being able to come into direct contact with the environment and/or from being able to be exposed to the environment. Thus, this variant embodiment may contribute to the intrinsic safety of the electrically chargeable device, in particular the inspection robot, and also for the operating safety of the electrically chargeable device, in particular the inspection robot, in a potentially explosive atmosphere. Potentially explosive atmospheres usually contain a fire-hazardous atmosphere which is provided with reactive components which could damage the moulding material which could result in a (fire-)hazardous situation. By means of a protecting (second) housing, the moulding material and the secondary coil (and optionally the (second) control unit contained therein) contained therein may be protected, which the reliability and the durability of the electrically chargeable device, usually formed by an inspection robot. In this case, the at least the second housing will usually be substantially bowl-shaped (cup-shaped). The bowl shape and the integral construction of the (second) housing usually contribute to the screening and thus protection of flammable, sensitive components, such as for example the secondary coil and the second moulding material, and optionally the second control unit, in and with respect to a potentially explosive atmosphere in which the device, in particular the inspection robot, are usually used. Often, the bottom wall of the second housing—also referred to as second partition wall—forms an outer side of the electrically chargeable device, in particular the inspection robot. Therefore, a high material efficiency may be achieved during production of the device, in particular the inspection robot. It is also conceivable for the first housing to be substantially bowl-shaped and in one piece, by means of which the aforementioned advantages may be achieved for the primary coil and the first moulding material, and optionally the first control unit. In such a variant embodiment, the bottom walls of both housings are turned towards each other in a state in which the device is charged by the inductive charging station. In this case, the moulding materials which are incorporated in both housings, respectively, are de facto separated from each other by means of both bottom walls (partition walls). The filling openings of the two housings, via which each moulding material is introduced in the housing, are in this case turned away from each other. Each filling opening is in this case situated at a distance from the bottom wall and is defined by the at least one peripheral wall which is integrally connected to the bottom wall. In this case, the filling openings are normally situated in a volume which is surrounded by chargeable device or inductive charging station respectively. In a preferred embodiment, at least one first housing comprises a, preferably angled and/or curved, first partition wall for separating the primary coil from the environment surrounding the inductive charging station and/or at least one second housing comprises a, preferably angled and/or curved, second partition wall for separating the secondary coil from environment surrounding the inspection robot. Preferably, the first partition wall and the second partition wall are designed to be complementary. Such a complementary design facilitates the alignment of the secondary coil with respect to the primary coil, as a result of which the charging process is able to proceed as efficiently as possible. The (electrically insulating) partition walls are usually flat, and preferably thin-walled, in order to limit the energy transfer barrier. In this case, a plane enclosed by the primary coil will preferably be situated substantially parallel to at least a part of the first partition wall and/or a plane enclosed by the secondary coil will be situated substantially parallel to at least a part of the second partition wall. Such an orientation results in a coil resting flat against an adjacent partition wall. It is conceivable for the first partition wall and the second partition wall to be configured to engage with one another, in such a way that a, preferably centrally situated, part of the first partition wall is situated at a (small) distance from a, preferably centrally situated, part of the second partition wall. As a result thereof, a limited free space (gap), preferably having a thickness of less than or equal to 6 millimetres, is created between parts of the opposite partition walls, as a result of which the transmission of electrical energy may take place in a relatively efficient manner (as a result of a more favourable positioning of the secondary coil in the magnetic field generated by the primary coil). As has already been indicated, the wall thickness is preferably relatively limited in order to be able to transmit as much energy as possible from the primary coil to the secondary coil. In this case, the thickness of the first partition wall and/or second partition wall is preferably smaller than or equal to 2.5 millimetres, more preferably smaller than or equal to 1.5 millimetres, and is in particular smaller than or equal to 1 millimetre. Preferably, at least one first housing and/or at least one second housing comprises at least one peripheral wall and a bottom element which is preferably integrally connected to the at least peripheral wall. The bottom element may be considered as a partition wall. Such a configuration of the housing results in the housing being bowl-shaped, which usually significantly facilitates introducing (initially liquid) moulding material into the housing and on the coil. It is conceivable for at least a part of the housing to be removed after the moulding material has at least partly hardened. This not only results in a weight saving, but also allows the primary coil and the secondary coil to be placed a relatively short distance apart during the charging process. De facto, the housing used in this variant embodiment thus only functions as a moulding die which can be removed after the moulding material has been introduced and at least partly hardened. However, in this case, it is greatly preferred if the fragile, and usually flammable and/or reactive, moulding material is still screened off by a protective, preferably fire-resistant and/or non-reactive, coating and/or alternative housing, in particular if the device, in particular the inspection robot, is actually going to be used in a potentially explosive atmosphere.

It is conceivable for the first housing to be configured to accommodate at least a part of the second housing and/or for the second housing to be configured to accommodate at least a part of the first housing. Such a cooperation between different housings facilitates the mutual alignment and stabilisation of the housings for the purpose of the induction charging process.

Usually, the inductive charging station will comprise a (first) carrying structure, with the first housing being connected to the carrying structure. The first housing is displaceable preferably with respect to the carrying structure between an original position, in which an inspection robot is positioned at a distance from the first housing, and at least one displaced position, in which an inspection robot engages with the first housing. To this end, the first housing may be coupled to the carrying structure of the inductive charging station in a rotatable manner and/or slidable manner. The (limited) displaceability of the housing facilitates the docking of an inspection robot, with the risk of damage to the first housing being limited. The inductive charging station may comprise at least one pressure element, in particular a spring, which cooperates with both the carrying structure and the first housing, which at least one pressure element is configured to force the first housing in the direction of the original position. This facilitates the alignment of the primary coil with respect to the secondary coil, which benefits the efficiency of the charging process. It is also conceivable for the inspection robot to comprise a (second) carrying structure with which the second housing is displaceably connected in a similar way.

The carrying structure of the inductive charging station is preferably configured as a kennel for accommodating at least a part of an inspection robot. The kennel de facto functions as a garage for the inspection robot and usually facilitates the remote steering of the inspection robot by an operator during docking (parking) of the inspection robot in or on the inductive charging station.

It may be advantageous if the inductive charging station comprises at least one guiderail for guiding an inspection robot in the direction of the primary coil, wherein at least a part of the guiderail preferably has a sloping orientation. The guiderail is primarily configured to correctly align an inspection robot to be docked with respect to the inductive charging station. The mobile inspection robot usually comprises several running wheels for displacing the inspection robot, at least two running wheels of which are positioned on opposite sides of the inspection robot and of which usually at least two running wheels are positioned one behind the other on the same side of the inspection robot. The running wheels positioned one behind the other may be surrounded by at least one caterpillar track, in order to manoeuvre the inspection robot more easily across uneven terrain. In this case, it is usually advantageous if the width of the guiderail is smaller than or equal to the distance between running wheels positioned on opposite sides of the inspection robot. If a(n upwardly) sloping guiderail is used, this will result in the situation where at least two running wheels, and—if used—some of the caterpillar tracks—may come away from the ground, which may not only stabilize docking, but may also prevent soiling of the inductive charging station, in particular the first housing, since dirt carried along by the running wheels will consequently usually not or hardly come into contact with the first housing. In addition, the use of a sloping guiderail makes it possible to ensure a constant alignment of the primary coil and the secondary coil, as the alignment no longer depends on the degree of wear of the running wheels/caterpillar tracks or on the soiling of the running wheels/caterpillar tracks.

It is furthermore advantageous if at least two running wheels situated on opposite sides of the inspection robot project with respect to the second housing positioned between these running wheels, viewed from a moving direction of the inspection robot. During movement of the inspection robot (and rotation of the running wheels) the dirt carried along by the running wheels will fall to the ground before the second housing, as a result of which fewer dirt residues will end up on the second housing.

The inspection robot typically comprises at least one sensor comprises selected from the group consisting of: a camera, a light sensor, a temperature sensor, a humidity sensor and an air sensor, in particular an electronic nose. It possibly clear that other types of sensors may also be used. It is also conceivable for the inspection robot to be provided with at least one light source. In order to be able to remote-control and/or to be able to remote-read the inspection robot wirelessly, it is usually advantageous if the inspection robot is provided with at least one communication device for wirelessly exchanging data with an inductive charging station and/or an external receiver, for example by means of 4G, 5G and/or Wi-Fi. The external receiver may be operated, for example, by an operator and may be configured for the operator to control the inspection robot. Of course, it is also conceivable for the inspection robot to be connected to an external device in a wired manner, such as a charger, diagnostic equipment, an external control unit, an external programming unit and the like.

In an advantageous variant embodiment, the second housing is at least partly made of a flame-extinguishing material. It is also conceivable for the second housing to be at least partly made of a material which is not ignitable at an ambient oxygen content of less than 50%. Such a material is regarded as a non-flammable material. This property may contribute further to the safety of the electrically chargeable device, in particular the inspection robot, and/or the use of the device in a potentially explosive atmosphere. It is therefore conceivable, for example, for the second housing to be at least partly made of a fluoropolymer, in particular a thermoplastic fluoropolymer, in particular PVDF. An advantage of using a fluoropolymer is that this is on not (in) flammable in an environment with an ambient oxygen content of less than 50%, which is an advantageous property which conventional thermoplastics are not able to satisfy. Furthermore, fluoropolymers are substantially electrically insulating, and in addition non-aggressive, heat-resistant and relatively strong, and thus relatively stable in and suitable for potentially explosive atmospheres. In addition, fluoropolymers have a relatively low density which is advantageous for the mass of the inductive charging station and in particular the inspection robot, as a result of which the energy use of the inspection robot can be limited. Furthermore, fluoropolymers, such as PVDF, are UV-resistant and therefore suitable for use in the open air for a prolonged period of time. Although PVDF usually has the best mechanical properties within the group of fluoropolymers, it is also conceivable for the thermoplastic fluoropolymer to be formed by a fluoropolymer selected from the group consisting of: PTFE (polytetrafluoroethylene), PFA (perfluoroalkoxy polymer resin), FEP (fluorinated ethylene propylene), ETFE (ethylene tetrafluoroethylene copolymer), ECTFE (ethylene chlorotrifluoroethylene), PCTFE (Kel-F polychlorotrifluoroethylene), TFE (trifluoroethanol), FPM (fluoroelastomeer), CTFE (chlorotrifluoroethylene), FFKM (perfluoroelastomer) and FKM (fluoroelastomer). It is also possible for at least a part of the first housing to be made from a non-flammable and/or flame-extinguishing material. The abovementioned materials for the second housing may also be used for the second housing. It is also conceivable for at least a part of the first housing and/or at least a part of the second housing to be made from an antistatic material.

At least a part of the first housing and/or at least a part of the second housing is preferably made from a polymer, more preferably a non-aggressive (inert) polymer. A polymer which is particularly suitable for manufacturing the (first or second) housing is polyvinylidene fluoride (PVDF) or a derivative thereof. PVDF is substantially electrically insulating and is in addition non-aggressive, heat-resistant and relatively strong, and thus relatively stable in potentially explosive atmospheres. In addition, PVDF has a relatively low density which is advantageous for the mass of the inductive charging station and in particular the inspection robot, as a result of which the energy use of the inspection robot can be limited. Furthermore, PVDF is UV-resistant and therefore suitable for use in the open air for a prolonged period of time.

The first moulding material is preferably initially introduced in the first housing in a liquid state, after which the first moulding material at least partly hardens. The second moulding material is preferably also initially introduced in the second housing in a liquid state, after which the second moulding material at least partly hardens. The moulding materials are usually based on a 2-component material (2K): a polymerisable starting material and a catalyst (hardener). Preferably, the first moulding material and/or the second moulding material is formed by a material selected from the group consisting of: (i) a pouring rubber, in particular silicone rubber, and/or (ii) a synthetic resin, in particular a polyester moulding resin, an epoxy moulding resin and/or a polyurethane moulding resin.

It is conceivable for the at least one first housing and/or the second housing to be provided with at least one cooling rib, in order to provide the respective housing with an increased surface area, which may facilitate the dissipation and/or distribution of heat generated by a coil accommodated in the housing.

The invention also relates to a mobile inspection robot for use in a system according to the invention.

The invention furthermore relates to an inductive charging station for use in a system according to the invention.

In addition, the invention relates to the use of a system according to the invention in a potentially explosive atmosphere.

The invention moreover relates to a method for wirelessly charging a mobile inspection robot in a potentially explosive atmosphere by using a system according to the invention, comprising the following steps: A) moving a mobile inspection robot until the inspection robot is situated in the vicinity of an inductive charging station; B) activating the primary coil of the inductive charging station, as a result of which wireless electrical energy is transferred from the primary coil of the inductive charging station to the secondary coil of the mobile inspection robot; and C) storing the transferred electrical energy in a chargeable power source of the mobile inspection robot. Steps A), B), and/or C) may overlap one another in time. During step A), the mobile inspection robot is preferably moved with respect to the inductive charging station in such a way that the second housing of the inspection robot engages with (makes contact with) the first housing of the inductive charging station. During step B), preferably at least a part of the heat generated by the primary coil, and optionally by one of the electrically/electronic components coupled to the primary coil, is dissipated away from the primary coil, and optionally aforementioned components, via the thermally conductive first moulding material, and preferably at least a part of the heat generated by the secondary coil is dissipated away from the secondary coil via the thermally conductive second moulding material. This prevents accumulation of heat at the location of and/or directly around each coil, as a result of which a significant local temperature increase may be prevented, as a result of which the charging process according to the invention is relatively explosion-proof and suitable for use in potentially explosive atmospheres.

The invention will be explained by means of variant embodiments described in the following non-limiting clauses.

1. System for wirelessly charging a mobile inspection robot in a potentially explosive atmosphere, comprising:
   at least one inductive charging station, comprising:
   at least one substantially electrically insulating first housing,
   at least one activatable primary coil which is accommodated in the first housing, and
   at least one thermally conductive and substantially electrically insulating first moulding material which is provided in the first housing and on the primary coil, in particular a synthetic resin and/or a pouring rubber, such that the primary coil is surrounded by the first moulding material and/or by the combination of the first housing and the first moulding material in a substantially air-free manner; and
   at least one electrically chargeable device, in particular a mobile inspection robot, comprising:
   at least substantially electrically insulating second housing,
   at least one secondary coil which is accommodated in the second housing,
   at least one thermally conductive and substantially electrically insulating second moulding material which is provided in the second housing and on the secondary coil, in particular a synthetic resin and/or a pouring rubber, in such a way that the secondary coil is surrounded by the second moulding material and/or by the combination of the second housing and the second moulding material in a substantially air-free manner;
   at least one chargeable power source which is electrically connected to the at least one secondary coil for driving the electrically chargeable device, in particular the mobile inspection robot,
   wherein, by activating at least one primary coil of at least one inductive charging station, electrical energy can be transmitted wirelessly to at least one secondary coil of at least one electrically chargeable device, in particular at least one mobile inspection robot, for charging the power source of the aforementioned electrically chargeable device, in particular the aforementioned mobile inspection robot.

2. System according to clause 1, wherein the primary coil of the inductive charging station is connected to an electrical power source, in particular a chargeable power source, of the inductive charging station for activating the primary coil.

3. System according to clause 2, wherein the inductive charging station comprises to at least one solar panel which is connected to the power source of the inductive charging station in order to charge the power source.

4. System according to one of the preceding clauses, wherein the inductive charging station comprises a first control unit.

5. System according to clause 4, wherein the first control unit is at least partly surrounded by the first moulding material and/or by the combination of the first housing and the first moulding material in a substantially air-free manner.

6. System according to one of the preceding clauses, wherein the at least one electrically chargeable device, in particular the at least one mobile inspection robot, comprises a second electronic control unit.

7. System according to clause 6, wherein the second electronic control unit is at least partly surrounded by the second moulding material and/or by the combination of the second moulding material and the second housing in a substantially air-free manner.

8. System according to one of clauses 4-7, wherein the first control unit of the inductive charging station is coupled to an identity sensor for detecting the identity of an electrically chargeable device, in particular a mobile inspection robot, and/or wherein the second control unit of the electrically chargeable device, in particular the mobile inspection robot, is coupled to a second identity sensor for detecting the identity of an inductive charging station, wherein the first control unit and/or the second control unit is/are programmed in such a manner that transfer of electrical energy from the primary coil to the secondary coil and/or charging the power source of the inspection robot only takes place if a detected identity of an inductive charging station and/or a mobile inspection robot corresponds to a predefined identity.

9. System according to one of clauses 4-8, wherein the first control unit and/or the second control unit is/are programmed to compare, preferably in a continuous manner, the amount of energy produced by the primary coil and the energy received by the secondary coil and, depending on the result of this comparison, continue or interrupt the transmission of electrical energy from the primary coil to the secondary coil and/or the charging of the power source of the electrically chargeable device, in particular the inspection robot.

10. System according to one of the preceding clauses, wherein the primary coil engages with the first housing the and/or wherein the secondary coil engages with the second housing.

11. System according to one of the preceding clauses, wherein at least one first housing comprises a, preferably angled and/or curved, first partition wall to separate the primary coil from the environment surrounding the inductive charging station and/or wherein at least one second housing comprises a, preferably angled and/or curved, second partition wall to separate the secondary coil from environment surrounding the electrically chargeable device, in particular the inspection robot.

12. System according to clause 11, wherein a plane enclosed by the primary coil is preferably situated substantially parallel to at least a part of the first partition wall and/or a plane and/or wherein a plane enclosed by the secondary coil is situated substantially parallel to at least a part of the second partition wall.

13. System according to clause 11 or 12, wherein the first partition wall and the second partition wall are configured to engage with one another, in such a way that a, preferably centrally situated, part of the first partition wall is situated at a distance from a, preferably centrally situated, part of the second partition wall.

14. System according to clause 13, wherein, in the engaged position of the first partition wall and the second partition wall, the free space between parts of the first partition wall and the second partition wall is smaller than or equal to 6 millimeters.

15. System according to one of clauses 11-14, wherein the thickness of the first partition wall and/or second partition wall is smaller than or equal to 2.5 millimetres, preferably is smaller than or equal to 1.5 millimetres, more preferably is smaller than or equal to 1 millimetre.

16. System according to one of the preceding clauses, wherein at least one first housing and/or at least one second housing comprises at least one peripheral wall and a bottom element which is preferably integrally connected to the at least peripheral wall.

17. System according to one of clauses 11-15 and clause 16, wherein the bottom wall of the first housing is formed by the first partition wall and/or the bottom wall of the second housing is formed by the second partition wall.

18. System according to one of the preceding clauses, wherein the first housing is configured to accommodate at least a part of the second housing and/or wherein the second housing is configured to accommodate at least a part of the first housing.

19. System according to one of the preceding clauses, wherein the inductive charging station comprises a carrying structure, wherein the first housing is connected to the carrying structure.

20. System according to clause 19, wherein the first housing is displaceable with respect to the carrying structure between an original position, in which an electrically chargeable device, in particular an inspection robot, is positioned at a distance from the first housing, and at least one displaced position, in which the electrically chargeable device, in particular the inspection robot, engages with the first housing.

21. System according to clause 20, wherein the inductive charging station comprises at least one pressure element, in particular a spring, which cooperates with both the carrying structure and the first housing, which at least one pressure element is configured to force the first housing in the direction of the original position.

22. System according to one of clauses 18-20, wherein the carrying structure is configured as a kennel for accommodating at least a part of an electrically chargeable device, in particular an inspection robot.

23. System according to one of the preceding clauses, wherein the inductive charging station comprises at least one guiderail for guiding an electrically chargeable device, in particular an inspection robot, in the direction of the primary coil, wherein at least a part of the guiderail preferably has a sloping orientation.

24. System according to one of the preceding clauses, wherein the mobile inspection robot comprises at least several running wheels for displacing the inspection robot, at least two running wheels of which are positioned on opposite sides of the inspection robot.

25. System according to clause 24, wherein at least two running wheels are positioned one behind the other on the same side of the inspection robot, and wherein the running wheels positioned one behind the other are preferably surrounded by at least one caterpillar track.

26. System according to clause 23 and clause 24 or 25, wherein the width of the guiderail is smaller than or equal to the distance between running wheels positioned on opposite sides of the inspection robot.

27. System according to one of clauses 24-26, wherein at least two running wheels situated on opposite sides of the inspection robot project with respect to the second housing positioned between these running wheels, viewed from a moving direction of the inspection robot.

28. System according to one of the preceding clauses, wherein the inspection robot comprises at least one sensor selected from the group consisting of: a camera, a light sensor, a temperature sensor, a humidity sensor and an air sensor, in particular an electronic nose.

29. System according to one of the preceding clauses, wherein the electrically chargeable device, in particular the inspection robot, is provided with at least one light source.

30. System according to one of the preceding clauses, wherein the electrically chargeable device, in particular the inspection robot, is provided with at least one communication device for wirelessly exchanging data with an inductive charging station and/or an external receiver.

31. System according to one of the preceding clauses, wherein the electrically chargeable device, in particular the inspection robot, is configured to be remote-controlled.

32. System according to one of the preceding clauses, wherein at least a part of the first housing and/or at least a part of the second housing is made of polyvinylidene fluoride (PVDF) or a derivative thereof.

33. System according to one of the preceding clauses, wherein the first moulding material is initially introduced in the first housing in a liquid state, after which the first moulding material at least partly hardens, and/or wherein the second moulding material is initially introduced in the second housing in a liquid state, after which the second moulding material at least partly hardens.

34. System according to one of the preceding clauses, wherein the first moulding material and/or the second moulding material is formed by a material selected from the group consisting of: (i) a pouring rubber, in particular silicone rubber, and/or (ii) a synthetic resin, in particular a polyester moulding resin, an epoxy moulding resin, and/or a polyurethane moulding resin.

35. System according to one of the preceding clauses, wherein the at least one first housing and/or the second housing is provided with at least one cooling rib.

36. System according to one of the preceding clauses, wherein at least one electrically chargeable device is formed by an electrically chargeable tool, in particular a portable tool.

37. System according to clause 36, wherein at least one electrically chargeable device is formed by an electrically chargeable tool, in particular a portable tool, and wherein at least one other electrically chargeable device is formed by a mobile inspection robot.

38. Electrically chargeable device, in particular a mobile inspection robot for use in a system according to one of the preceding clauses.

39. Inductive charging station for use in a system according to one of clauses 1-37.

40. Use of a system according to one of clauses 1-37 in a potentially explosive atmosphere.

41. Method for wirelessly charging an electrically chargeable device, in particular a mobile inspection robot, in a potentially explosive atmosphere by using a system according to one of clauses 1-37, comprising the following steps:
A) displacing of an electrically chargeable device, in particular a mobile inspection robot, until the electrically chargeable device, in particular the inspection robot, is situated in the vicinity of an inductive charging station;
B) activating the primary coil of the inductive charging station, as a result of which wireless electrical energy is transferred from the primary coil of the inductive charging station to the secondary coil of the electrically chargeable device, in particular the mobile inspection robot; and
C) storing the transferred electrical energy in a chargeable power source of the electrically chargeable device, in particular the mobile inspection robot.

42. Method according to clause 41, wherein, during step A), the electrically chargeable device, in particular the mobile inspection robot, is moved with respect to the inductive charging station in such a way that the second housing of the electrically chargeable device, in particular the inspection robot, engages with the first housing of the inductive charging station.

43. Method according to clause 41 or 42, wherein, during step B), at least a part of the heat generated by the primary coil is dissipated away from the primary coil via the thermally conductive first moulding material, and at least a part of the heat generated by the secondary coil is dissipated away from the secondary coil via the thermally conductive second moulding material.

The invention will be explained by means of non-limiting illustrative embodiments illustrated in the figures below, in which:

BRIEF DESCRIPTION OF THE DRAWINGS

Figure 1A:
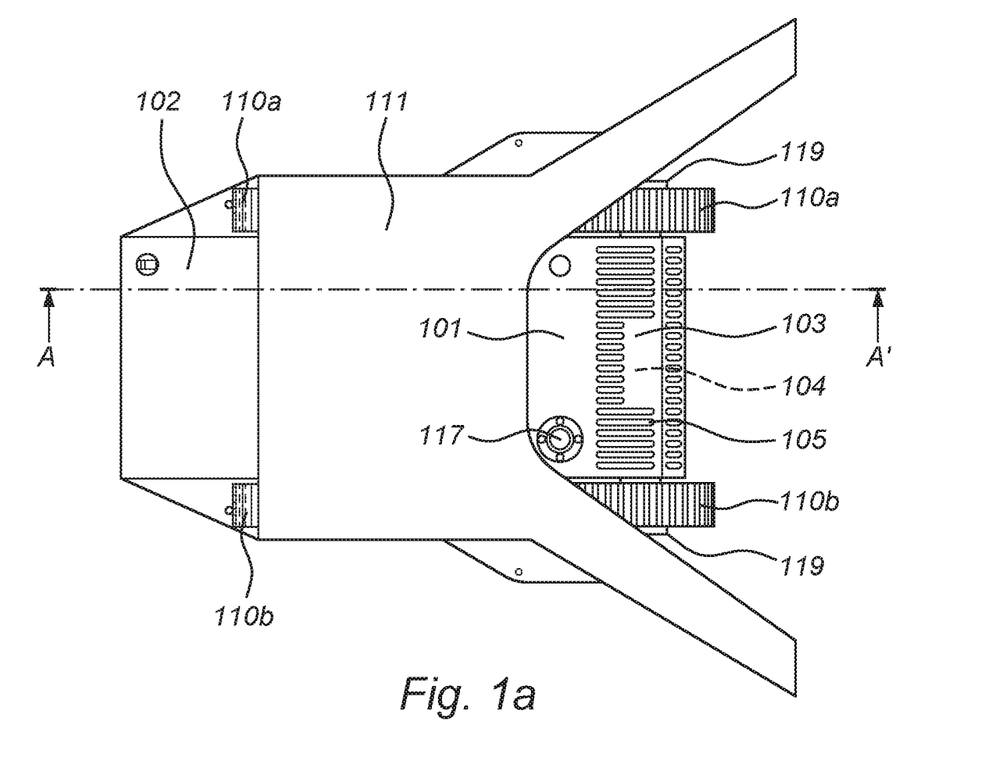
FIG. 1a shows a diagrammatic plan view of an inductive charging station and a mobile inspection robot according to the invention.
Figure 1B:
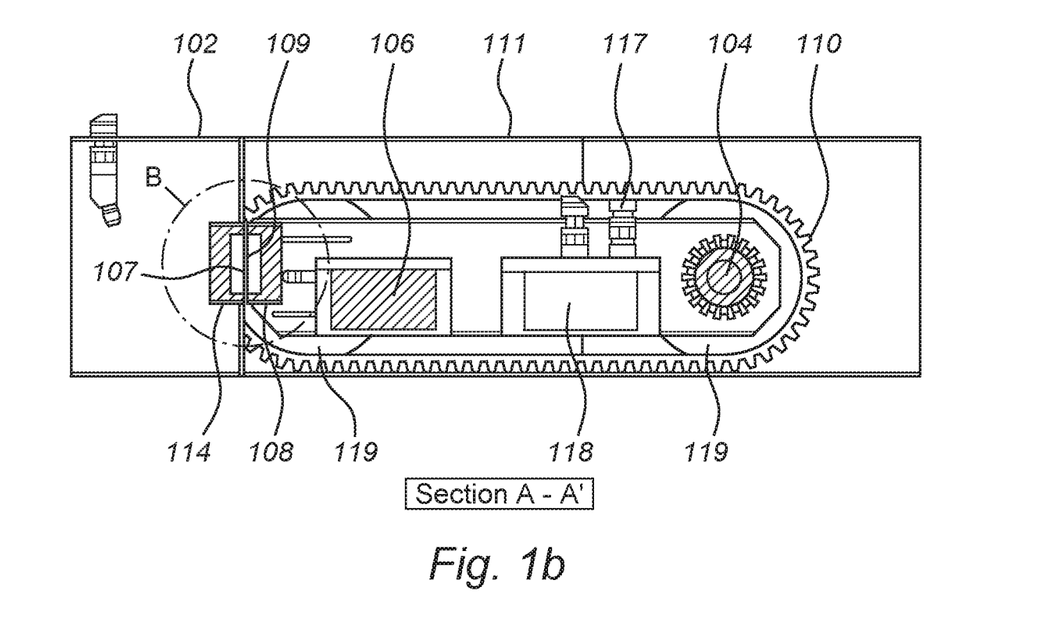
FIG. 1b a shows a cross section of the inductive charging station and the mobile inspection robot as illustrated in FIG. 1a, FIG. 1c shows a detailed representation of a part of the cross section as illustrated in FIG. 1b, FIGS. 2a and 2b show a possible embodiment of an inductive charging station according to the invention.
Figure 1C:
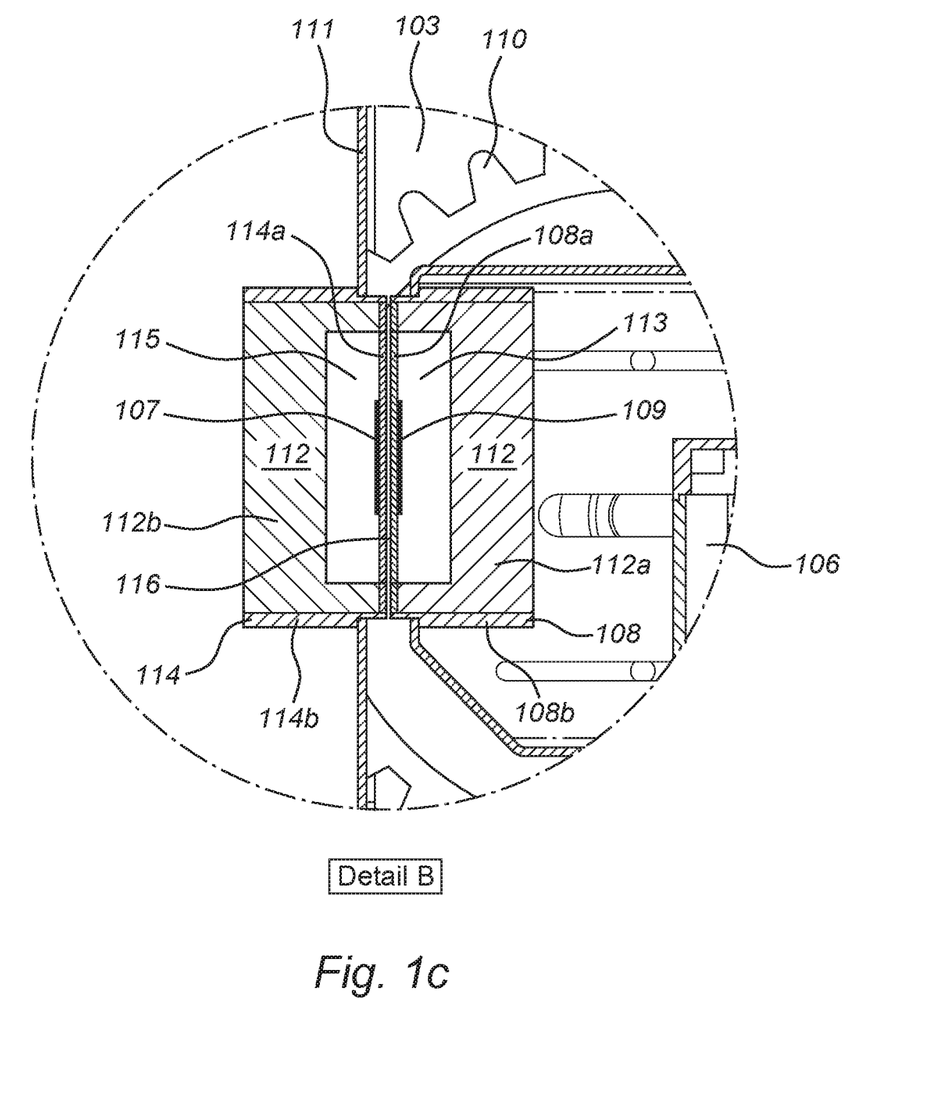

FIGS. 1a-c show a system for wirelessly charging a mobile inspection robot (101) in a potentially explosive atmosphere according to the invention. In these figures, similar or corresponding parts are denoted by identical reference numerals.

DESCRIPTION OF THE INVENTION

FIG. 1a shows a plan view of an inductive charging station (102) and a mobile inspection robot (101). The inductive charging station (102) comprises a carrying structure (111) in the form of a covering (111) which partly surrounds the inspection robot (101). In the illustrated embodiment, the mobile inspection robot (101) is provided with running wheels (119) which are surrounded by caterpillar tracks (110a, 110b). The inspection robot (101) comprises a third housing (103) and an electric motor (104) accommodated in the third housing (103) for driving the inspection robot (101). At the location of the electric motor (104), the housing (103) is provided with ventilation openings (105).

FIG. 1b shows a cross section of the assembly along the line A-A', as shown in FIG. 1a. The inductive charging station (102) comprises a substantially electrically insulating first housing (114) which is accommodated in the carrying structure (111). This first housing (114) contains a primary coil (107) for generating, for example, a magnetic field. Further details of the first housing (114) and the primary coil (107) contained therein are illustrated in FIG. 1c, which shows a detailed representation of selection B.

The mobile inspection robot (101) comprises a substantially electrically insulating second housing (108). The second housing (108) contains a secondary coil (109) which can be coupled magnetically with the primary coil (107) of the charging station (102). Further details of the second housing (108) and the secondary coil (109) contained therein are also illustrated in FIG. 1c.

FIG. 1b furthermore shows that the mobile inspection robot (101) comprises two running wheels (119) which are positioned one behind the other and which are surrounded by the caterpillar track (110). Two running wheels (119) which are situated on opposite sides of the inspection robot (101) project with respect to a part the second housing (108) positioned between the running wheels (119). Furthermore, the inspection robot (101) comprises a chargeable electrical power source (106) which is connected to the secondary coil (109). This chargeable electrical power source (106) functions as a power supply for the electric motor (104). Furthermore, the electrical power source (106) and/or the electric motor (104) are coupled to further electrical components (118), such as for example a converter. The inspection robot (101) is provided with an inspection unit (117). The inspection unit (117) is for example configured for visual, thermographic, odorous and/or auditory inspection.

FIG. 1c shows a detailed representation of selection B as shown in FIG. 1b. The inspection robot (101) comprises a second housing (108) and a secondary coil (109) which is accommodated in the second housing (108) and which can be magnetically coupled to the primary coil (107) of the inductive charging station (102) for charging the chargeable electrical power source (106). The secondary coil (109) is in this case surrounded by the substantially electrically insulating second moulding material (112) in a substantially air-free manner. The thermally conductive and substantially electrically insulating second moulding material (112a) is, for example, a synthetic resin and/or a pouring rubber. The second moulding material (112a) is initially introduced in the second housing (108) in a liquid state. The moulding material (112) has the advantage that it is readily moldable, due to its low viscosity. As a result thereof, the risk of air inclusions in the resulting hardened moulding material (112a) after the moulding material (112a) has been introduced in a liquid state, is minimal. The secondary coil (109) may be arranged, for example, in the second housing (108), after which the moulding material (112a) is subsequently provided in a liquid state, in such a way that the space present in the second housing (108) around the secondary coil (109) is filled by the second moulding material (112) in an air-free manner. The moulding material (112a) may subsequently be at least partly hardened. The air-free filling of the environment of the secondary coil (109) is essential in order to be able to ensure safe use in a potentially explosive atmosphere. The presence of air, gas and/or other impurities may result in a risk of explosion in combination possibly internally present electrical energy and/or static electricity. Embedding the secondary coil (109) in the moulding material (112a) offers a solution to this problem. The mobile inspection robot (101) also comprises a second electronic control unit (113). In the illustrated embodiment, the second electronic control unit (113) is also surrounded by the second housing (108) and the thermally conductive and substantially electrically insulating moulding material (112) in a substantially air-free manner. However, it is also conceivable for the second electronic control unit (113) to be surrounded only by the moulding material (112a) in a substantially air-free manner. Embedding the secondary coil (109) and the second electronic control unit (113) in the moulding material (112a) provides resistance to influences from the environment. Embedding ensures that if the inspection robot (101) is situated in a potentially explosive atmosphere, the potentially explosive atmosphere cannot be ignited, neither by sparks from the secondary coil (109) and/or the electronic control unit (113), nor by heating inside the molded casing of moulding material (112a). The second housing (108) is preferably made of a chemically non-aggressive thermoplastic polymer. It is advantageous if the second housing (108) is electrically insulating so as to be able to prevent any disruption and/or reduction in the efficiency of the charging process. In the illustrated embodiment, the second housing (108) comprises different wall thicknesses. A wall portion (108a), in particular a bottom wall (108a), or second partition wall (108a), of the second housing (108) near the secondary coil (109) is relatively thin-walled, for example having a thickness of 1 mm, which ensures that the secondary coil is exposed to a substantial part of the magnetic field created during charging. Furthermore, the second housing (108) comprises a peripheral wall (108b) and a bottom wall (108a) which is integrally connected to the at least one peripheral wall (108b), wherein the bottom wall (108a) of the at least one integrally formed second housing (108) forms an angled and second partition wall (108a) for separating the secondary coil (109) from the environment surrounding the electrically chargeable device (101), in particular the inspection robot (101). The second housing (108) as such is in this case configured to separate the secondary coil (109) and the second moulding material (112a) from the environment surrounding the electrically chargeable device (101), in particular the inspection robot (101). The second housing (108), and in particular the partition wall (108a), is preferably at least partly made of polyvinylidene fluoride (PVDF) or a derivative thereof. In addition to the advantage of great strength and good resistance to chemicals and UV light, PVDF bonds with the moulding material (112) used. The bonding may be improved by using a primer (layer) between the PVDF and the moulding material.

As has already been described above, the charging station (102) comprises a primary coil (107) for generating a magnetic field. The charging station (102) comprises a first housing (114) which contains the primary coil (107). In the illustrated embodiment, the primary coil (107) is in this case surrounded by the first housing (114) and a thermally conductive and substantially electrically insulating first moulding material (112b) in a substantially air-free manner. However, it is also possible for the primary coil (107) to be surrounded substantially completely by the first moulding material (112b). The first moulding material (112b) is substantially identical to the second moulding material (112a) of the inspection robot (101) as a result of which the use of the first moulding material (112b) for embedding the primary coil (107) in the first housing (114) therefore has the same advantages as described above for the mobile inspection robot (101). The charging station (102) also comprises a first electronic control unit (115) which is connected to the primary coil (107). The first electronic control unit (115) is also surrounded by the first housing (114) and the thermally conductive and substantially electrically insulating first moulding material (112b) in a substantially air-free manner. A wall portion (114a), or the first partition wall (114a), of the first housing (114) near the primary coil (107) is in this case also thinner than a wall portion (114b) of the first housing (114) at a distance from the primary coil (107).

FIG. 1c shows a possible position of the inspection robot (101) in the charging station (102) during the wireless charging of the inspection robot (101). The primary coil (107) is in this case situated at a distance from the secondary coil (109). In particular, the first partition wall (114a) is situated at a distance from the second partition wall (108a). Between the primary coil (107) and the secondary coil (109), and in particular between the first partition wall (114a) and the second partition wall (108a), a free space (116) or air gap (116) is present. The distance between the primary coil (107) and the secondary coil (109), and in particular the distance between the first partition wall (114a) and the second partition wall (108a) at the location of the primary and secondary coil (107, 109), respectively, is preferably between 0 and 6 mm. Upon activation of the primary coil (107) of the inductive charging station (102), this facilitates the wireless transmission of electrical energy to the secondary coil (109) of the mobile inspection robot (101) in order to charge the power source (106) of the aforementioned mobile inspection robot (101).

Figure 2A:
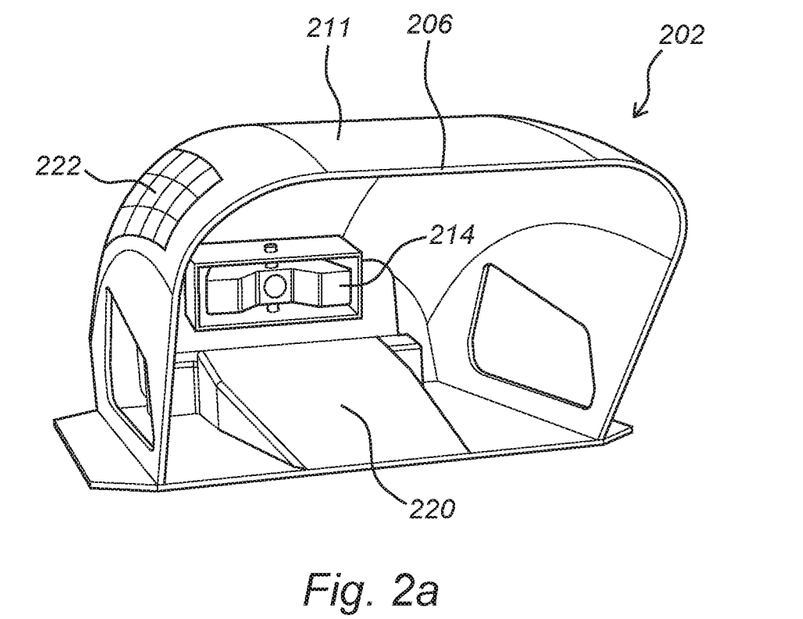
Figure 2B:
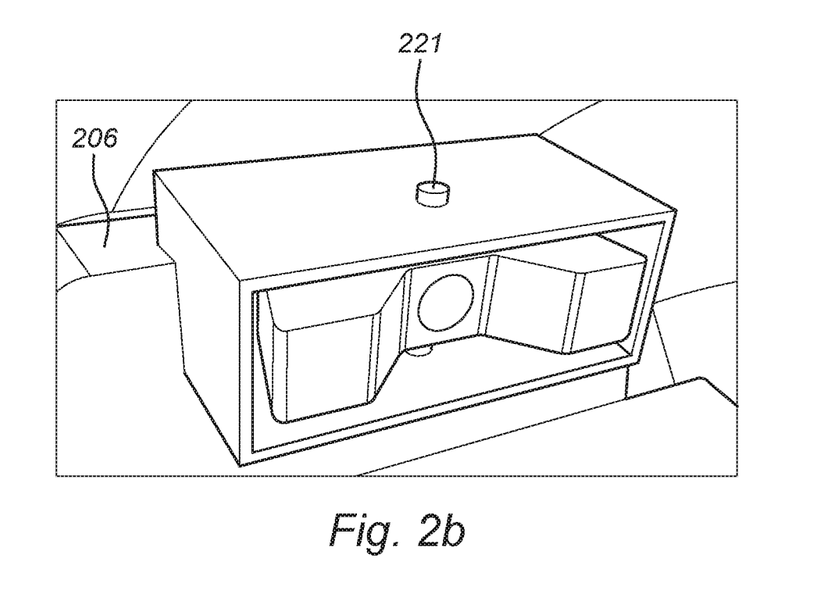

FIGS. 2a and 2b show a diagrammatic representation of a possible embodiment of an inductive charging station (202) according to the invention for use in a system for wirelessly charging a mobile inspection robot (not shown) in a potentially explosive atmosphere according to the invention. In these figures, identical or corresponding parts are denoted by identical reference numerals. The inductive charging station (202) comprises a first housing (214) and an activatable primary coil (not shown) which is accommodated in the first housing (214). The charging station (202) furthermore comprises a carrying structure (211) or covering (211) for at least partly surrounding an inspection robot (not shown). An advantage of the covering (211) is that it offers protection against influences from outside for the mobile inspection robot during the wireless charging of the aforementioned inspection robot.

In the illustrated embodiment, the first housing (214) is displaceably and also rotatably accommodated in the charging station (202). It is conceivable for a part of the covering 211 which—in a coupled position—is positioned above the inspection robot, not to be used. The first housing (214) is in this case rotatable about a rotation point (221). However, it is also possible for the first housing (214) and/or the carrying structure (211) to comprise one or several resilient parts and/or pressure elements in order to facilitate the alignment of the primary coil with respect to the secondary coil, and thus achieving (optimum) contact with the inspection robot to be charged. The charging station (202) also comprises a guiderail (220) for guiding a mobile inspection robot in the direction of the primary coil. In the illustrated embodiment, the guiderail (220) because a sloping orientation. The slope of the guiderail (220) is, for example, between 5 and 15 degrees. It is conceivable for the running wheels and/or the (caterpillar) tracks of the inspection robot to be charged fall on both sides of the guiderail (220), viewed from the direction of guiding. The guiderail (220) may, for example, make contact with a part of the frame and/or the housing of the inspection robot during guiding of the inspection robot in the direction of the primary coil. However, it is also conceivable for the guiderail (220) to serve as a drive-on ramp for an inspection robot. The primary coil of the inductive charging station (202) is connected to an electrical power source (206), in particular a chargeable power source (206), of the inductive charging station (202) in order to activate the primary coil. In the illustrated embodiment, the inductive charging station (202) also comprises a solar panel (222) which is connected to the power source (206) for charging the power source (206). In the illustrated embodiment, the solar panel (222) is positioned on a side of the carrying structure (211) facing away from the second housing (214). Obviously, it is also possible for the inductive charging station (202) to comprise another power supply and/or for the inductive charging station (202) to be coupled to a non-chargeable power source.

Figure 3A:
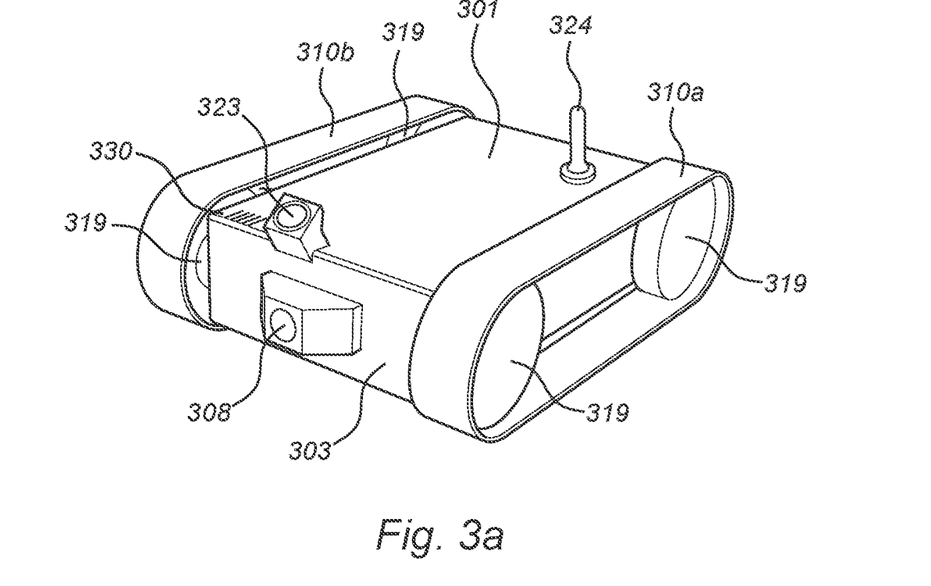
FIGS. 3a and 3b show a possible embodiment of a mobile inspection robot according to the invention.
Figure 3B:
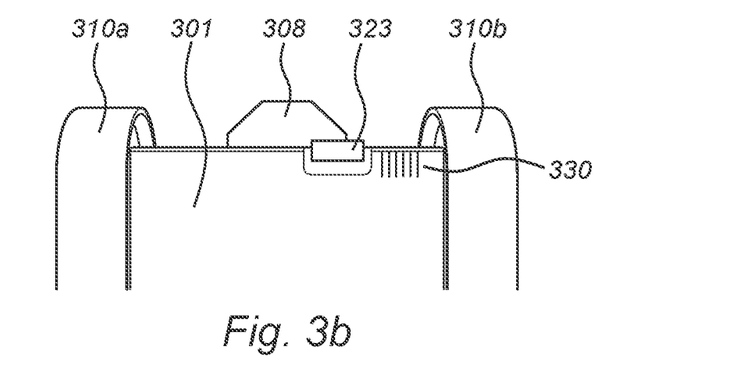

FIGS. 3a and 3b show a diagrammatic representation of a possible embodiment of an inspection robot (301) according to the invention for use in a system for wirelessly charging the inspection robot (301) in a potentially explosive atmosphere according to the invention. In these figures, identical or corresponding parts are denoted by identical reference numerals.

The inspection robot (301) comprises a second housing (308) and a secondary coil (not shown) which is accommodated in the second housing (308) and which can be coupled magnetically with the primary coil of the charging station (not shown), for charging a chargeable electrical power source (not shown). The inspection robot (301) furthermore comprises a thermally conductive and substantially electrically insulating second moulding material (not shown) which is provided in the second housing (308) and on the secondary coil, in particular a synthetic resin and/or a pouring rubber, wherein the secondary coil is surrounded by the second moulding material and/or by the combination of the second housing (308) and the second moulding material in a substantially air-free manner. The secondary coil is also electrically connected to a chargeable power source (not shown) and electric motor (not shown) for driving the mobile inspection robot (301).

The inspection robot (301) relates to a mobile inspection robot (310) which, in the illustrated embodiment, is provided on both sides with running wheels (319) which are placed one behind the other and which are surrounded by caterpillar tracks (310a, 310b). Two running wheels (319) situated on opposite sides of the inspection robot (301) project with respect to a part of the second housing (308) positioned between the running wheels (319). The inspection robot (301) comprises an inspection camera (323) for inspection purposes and an antenna (324) for receiving and/or transmitting signals, such as for example radio-frequency signals. It is conceivable for the inspection robot (301) to comprise a plurality of sensors, for example a light sensor, a temperature sensor, a humidity sensor, an air sensor, a gas sensor and/or an electronic nose. In the shown embodiment, the second housing (303) is provided with optional cooling ribs (330). It is also conceivable that the first housing of the charging station is provided with cooling ribs. In the illustrated embodiment, the inspection robot (301) comprises a third housing (303) in order to protect, for example, the electrical power source and/or the electric motor. However, it is also possible for the second housing (308) and the third housing (303) to be mutually integrated and/or for the third housing (303) to form part of the second housing (308).

Figure 4:
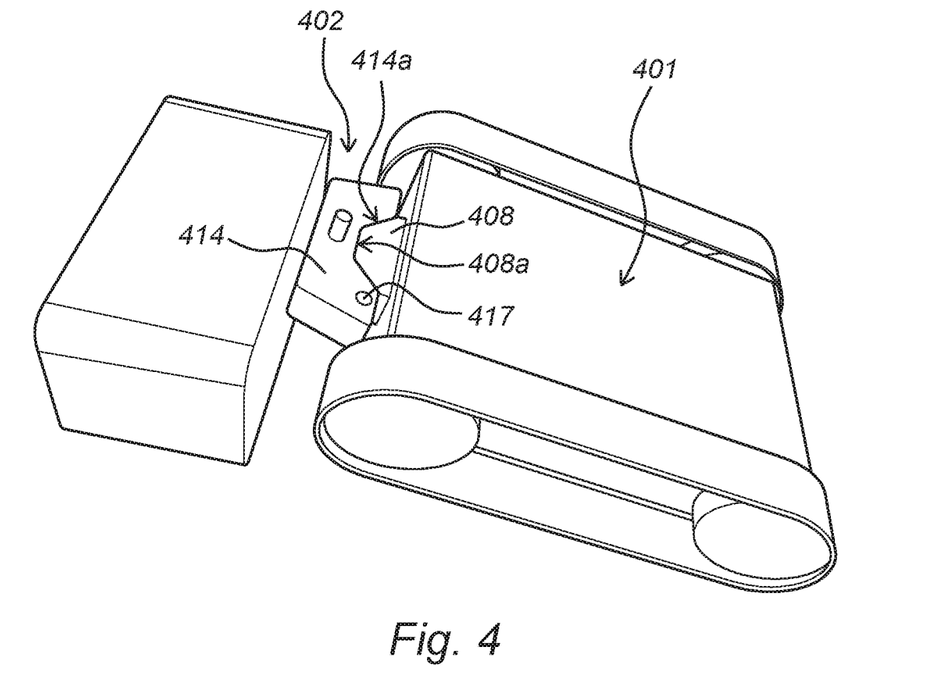
FIG. 4 shows an assembly of an inductive charging station and a mobile inspection robot according to the invention.

FIG. 4 shows an assembly of an inductive charging station (402) and an inspection robot (401) according to the invention. The inspection robot (401) and the inductive charging station (402) each have substantially the same components and functionality as the embodiments described in FIGS. 1-3. FIG. 4 shows the cooperation between the inductive charging station (402) and the mobile inspection robot (401) during the wireless transmission of electrical energy. In the illustrated embodiment, the first housing (414) of the inductive charging station (402) comprises an angled first partition wall (414a) for separating the primary coil from the environment surrounding the inductive charging station (402). The second housing (408) of the inspection robot (401) comprises an angled second partition wall (408a) for separating the secondary coil from the environment surrounding the inspection robot (401). In this case, a plane enclosed by the primary coil is situated substantially parallel to at least a part of the first partition wall (414a), wherein a plane enclosed by the secondary coil is situated substantially parallel to at least a part of the second partition wall (408a). The first partition wall (414a) and the second partition wall (408a) are configured to engage with one another, with the first partition wall (414a) and the second partition wall (408a) substantially having a complementary design. This results in a desired alignment of the secondary coil with respect to the primary coil, which may significantly aid the efficiency of the charging process. In this case, the first housing (414) is partly accommodated in a part of the second housing (408). The charging station (402) also comprises a first control unit (not shown) which is coupled to a first identity sensor (417) for detecting the identity of the mobile inspection robot (401), wherein the first control unit is programmed in such a way that the transmission of electrical energy from the primary coil to the secondary coil and/or the charging of the power source of the inspection robot only takes place if a detected identity of the mobile inspection robot (401) corresponds to a predefined identity. However, it is also conceivable for the inspection robot (401) to comprise an identity sensor for detecting the identity of an inductive charging station according to an identical principle.

It will be clear that the invention is not limited to the exemplary embodiments illustrated and described here, but that countless variants are possible without departing from the scope of the attached claims and that these will be obvious to the person skilled in the art. In this case, it is conceivable for different inventive concepts and/or technical measures of the above-described variant embodiments to be fully or partly combined without moving away from the inventive idea described in the attached claims.

The verb 'comprise' and conjugations thereof used in this patent are understood to mean not only 'comprise', but also the expressions 'contain', 'substantially consist', 'formed by', and conjugations thereof.

The invention claimed is:

1. A system including a mobile inspection robot and an inductive charging assembly for wirelessly charging at least one power source of the mobile inspection robot, the inductive charging assembly adapted to prevent any electrical sparks which may be created by the wireless charging of the power source contacting a potentially explosive atmosphere comprising a fire-hazardous atmosphere with reactive components in which the inductive charging assembly and mobile inspection robot are located, the inductive charging assembly comprising:
   at least one inductive charging station, comprising:
      at least one substantially electrically insulating first housing,
      at least one activatable primary coil which is accommodated in the at least one first housing and directly engaged with a first wall of the at least one first housing,
      at least one first control unit connected to the at least one primary coil, and
      at least one thermally conductive and substantially electrically insulating first moulding material, the at least one thermally conductive and substantially electrically insulating first moulding material is a synthetic material and/or a pouring rubber, which is provided in the at least one first housing and on the at least one primary coil and the at least one first control unit so as to embed the at least one primary coil and the at least one first control unit in the at least one first moulding material such that the at least one primary coil and the at least one first control unit are completely surrounded by a combination of the at least one first housing and the at least one first moulding material in an air-free manner so as to prevent electrical sparks from the at least one inductive charging station and prevent the contact of electrical sparks with the potentially explosive atmosphere during the inductive charging process; and
   the mobile inspection robot comprising:
      at least one substantially electrically insulating second housing,
      at least one secondary coil accommodated in the at least one second housing and directly engaged with a second wall of the at least one second housing,
      at least one second control unit connected to the at least one secondary coil,
      at least one thermally conductive and substantially electrically insulating second moulding material, wherein the at least one thermally conductive and substantially electrically insulating second moulding material is a synthetic material and/or a pouring rubber, which is provided in the at least one second housing and on the at least one secondary coil and the at least one second control unit, so as to embed the at least one secondary coil and the at least one second control unit in the at least one second moulding material such that the at least one secondary coil and the at least one second control unit are completely surrounded by a combination of the at least one second housing and the at least one second moulding material in an air-free manner so as to prevent electrical sparks from the mobile inspection robot and prevent the contact of electrical sparks with the potentially explosive atmosphere during the inductive charging process;
      the at least one chargeable power source electrically connected to the at least one secondary coil for driving the mobile inspection robot,
   wherein, by activating at least one primary coil of the at least one inductive charging station, electrical energy is transmitted wirelessly to the at least one secondary coil of the mobile inspection robot, for charging the at least one power source of the mobile inspection robot, wherein the at least one second housing comprises at least one peripheral wall which is integrally connected to the second wall, wherein the second wall of the at least one integrally formed second housing forms an angled second partition wall or a curved second partition wall to separate the at least one secondary coil from the potentially explosive atmosphere surrounding the mobile inspection robot,
   wherein the at least one second housing is configured to separate the at least one secondary coil and the at least one second moulding material from the potentially explosive atmosphere surrounding the mobile inspection robot, and
   wherein the mobile inspection robot is charged by the at least one inductive charging station without sparks contacting the potentially explosive atmosphere.

2. The system as claimed in claim 1, wherein the at least one primary coil of the at least one inductive charging station is connected to the at least one chargeable power source of the at least one inductive charging station to activate the at least one primary coil.

3. The system as claimed in claim 1, wherein the at least one first housing comprises at least one peripheral wall which is integrally connected to the at least one peripheral first wall.

4. The system as claimed in claim 3, wherein the first wall of the at least one first housing is formed by an angled first partition wall or a curved first partition wall to separate the at least one primary coil from the potentially explosive atmosphere surrounding the at least one inductive charging station.

5. The system as claimed in claim 3, wherein a plane enclosed by the at least one primary coil is parallel to at least a part of the first partition wall and/or a plane and/or wherein a plane enclosed by the at least one secondary coil is situated substantially parallel to at least a part of the second partition wall.

6. The system as claimed in claim 5, wherein the first partition wall and the second partition wall are configured to engage with one another, in such a way that a centrally situated part of the first partition wall is situated at a distance from a centrally situated part of the second partition wall.

7. The system as claimed in claim 6, wherein, in the engaged position of the first partition wall and the second partition wall, a free space between parts of the first partition wall and the second partition wall is smaller than or equal to 6 millimeters.

8. The system as claimed in claim 1, wherein the at least one second housing is at least partly made of a flame-extinguishing material.

9. The system as claimed in claim 1, wherein the at least one second housing is at least partly made of a material that is not ignitable at an ambient oxygen content of less than 50%.

10. The system as claimed in claim 1, wherein the at least one second housing is at least partly made of a thermoplastic fluoropolymer.

11. The system as claimed in claim 10, wherein the thermoplastic fluoropolymer is formed by PVDF.

12. The system as claimed in claim 1, wherein the at least one first housing is configured to accommodate at least a part of the at least one second housing and/or wherein the at least one second housing is configured to accommodate at least a part of the at least one first housing.

13. The system as claimed in claim 1, wherein the at least one inductive charging station comprises at least one guiderail for guiding the mobile inspection robot, in the direction of the at least one primary coil, wherein at least a part of the at least one guiderail has a sloping orientation.

14. The system as claimed in claim 1, wherein the mobile inspection robot comprises a plurality of running wheels for displacing the mobile inspection robot, wherein at least two running wheels are positioned on opposite sides of the mobile inspection robot.

15. The system as claimed in claim 1, wherein the mobile inspection robot comprises at least one sensor selected from the group consisting of: a camera, a light sensor, a temperature sensor, a humidity sensor, and an electronic nose.

16. The system as claimed in claim 1, wherein the at least one first moulding material is initially introduced in the at least one first housing in a liquid state, after which the at least one first moulding material at least partly hardens, and/or wherein the at least one second moulding material is initially introduced in the second housing in a liquid state, after which the at least one second moulding material at least partly hardens.

17. The system as claimed in claim 1, wherein the at least one first housing and/or the at least one second housing is provided with at least one cooling rib.

18. An electrically chargeable device for use in a system as claimed in claim 1.

19. The system as claim in claim 1, wherein the reactive components comprise one or more of the following: hydrocarbon, acetylene, hydrogen, hydrogen sulfide, vapours, mists, and dust.

20. An apparatus including a mobile inspection robot and an inductive charging assembly located in a potentially explosive atmosphere, the inductive charging assembly configured to wirelessly charge a power source of said mobile inspection robot in said potentially explosive atmosphere by preventing any electrical sparks which may be created by the charging of the power source contacting said potentially explosive atmosphere, said inductive charging assembly including an inductive charging station and said mobile inspection robot which are interconnected to perform the wireless charging of the said power source, and said inductive charging assembly is adapted by, providing said inductive charging station with a first housing in which is located a primary coil which is directly engaged with a first wall of said first housing, a first control unit, connected to the primary coil and a first moulding material, wherein the primary coil and first control unit are embedded in said first moulding material so that they are completely surrounded by the combination of the first housing and the first moulding material in an air-free manner so as to be sealed off from said potentially explosive atmosphere so as to prevent said electrical sparks contacting said potentially explosive atmosphere; and providing said mobile inspection robot with a second housing in which is located a secondary coil which is directly engaged with a second wall of said second housing, a second control unit connected to the secondary coil and a second moulding material, wherein the secondary coil and second control unit are embedded in said second moulding material so that they are completely surrounded by the combination of the second housing and the second moulding material in an air-free manner so as to be sealed off from said potentially explosive atmosphere so as to prevent said electrical sparks contacting said potentially explosive atmosphere.

* * * * *

UNITED STATES PATENT AND TRADEMARK OFFICE
CERTIFICATE OF CORRECTION

PATENT NO. : 11,518,256 B2
APPLICATION NO. : 16/651866
DATED : December 6, 2022
INVENTOR(S) : Roelof Schreurs It is certified that error appears in the above-identified patent and that said Letters Patent is hereby corrected as shown below:

In the Claims

Column 21, Line 5, Claim 3, after "the" delete "at least one peripheral"

Column 22, Line 16, Claim 19, delete "claim" and insert -- claimed --

Signed and Sealed this
Twenty-eighth Day of February, 2023

*Katherine Kelly Vidal*
Katherine Kelly Vidal
*Director of the United States Patent and Trademark Office*